Patented May 9, 1939

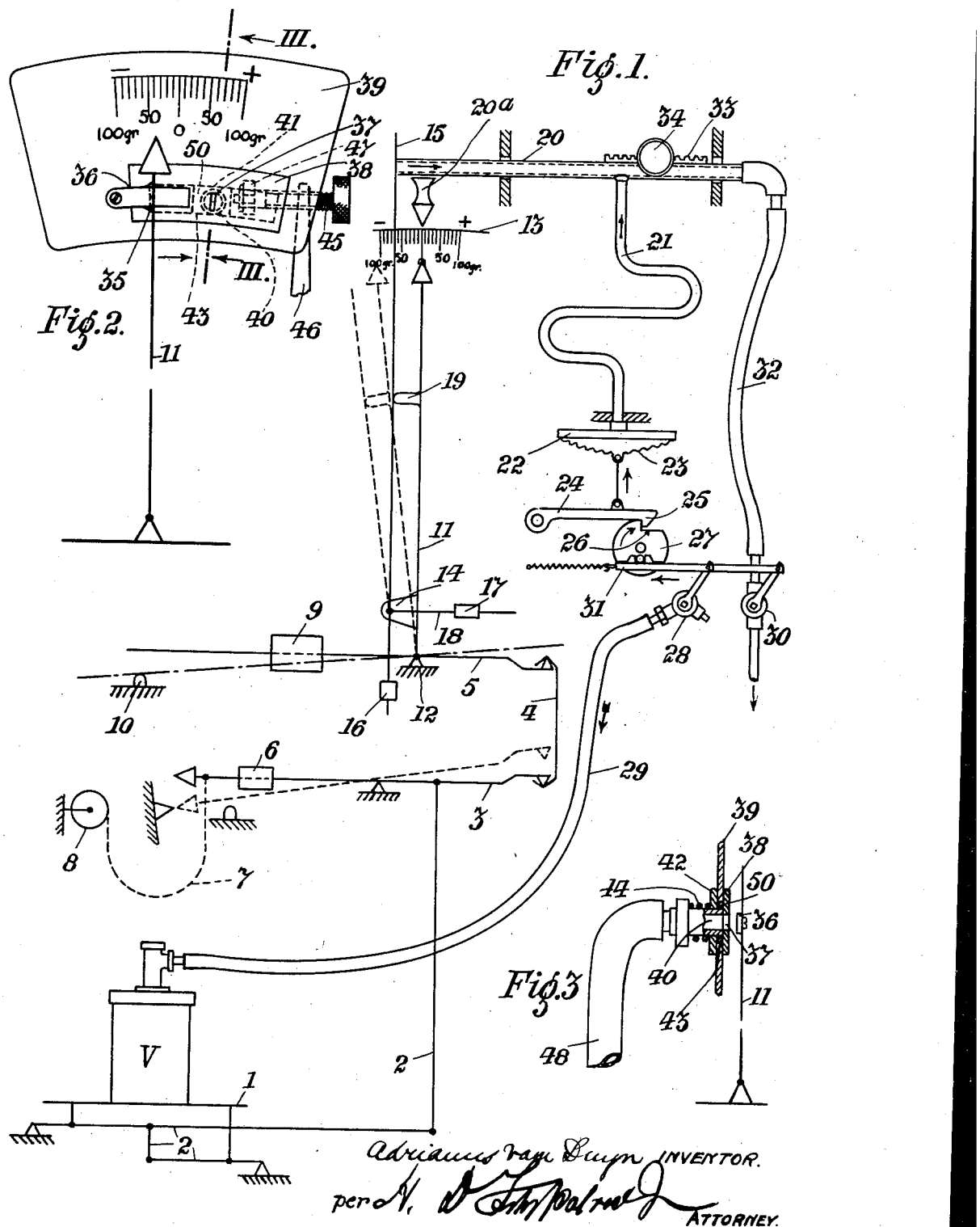

2,157,197

UNITED STATES PATENT OFFICE 2,157,197

APPARATUS FOR MEASURING PREDETERMINED QUANTITIES BY WEIGHING

Adrianus van Duyn, Rotterdam, Netherlands

Application September 21, 1937, Serial No. 164,833
In Great Britain September 24, 1936

6 Claims. (Cl. 249—1)

This invention relates to measuring predetermined quantities of flowable substance by means of weighing apparatus wherein the supply of substance being weighed is cut off when a predetermined load of the weighing apparatus is reached.

An object of the invention is to provide improved means for cutting-off the supply of substance being weighed.

Another object is to provide pneumatic means controlled by a moving part of the weighing apparatus to cut off the supply of substance being weighed.

Another object is to provide pneumatic means operated from a source of abnormal fluid pressure, preferably a source of vacuum.

Another object is to provide an obturator on a moving part of the weighing mechanism to cause fluid pressure to effect cut-off of the supply when the predetermined weight has been reached.

Another object is to provide a flexible diaphragm or the like for controlling a valve provided to cut off the supply.

Another object is to provide means for adjusting the predetermined position of the weighing mechanism at which the supply is cut off.

The following specification will explain further objects of the invention, which will now be described with reference to the accompanying drawing, but simply by way of example, as applied to an over- and under-weight weighing apparatus.

Fig. 1 is a diagrammatic elevation of weighing apparatus in accordance with the invention.

Fig. 2 is a part diagrammatic arrangement of an alternative construction.

Fig. 3 is a sectional view on the line 3—3 of Fig. 2.

Referring to the drawing,

The weighing apparatus comprises a load platform 1 connected by linkage 2 to an overhead tare beam 3, an end of which is connected by a link 4 to an end of a weigh beam 5 located above the tare beam. The latter is provided with a sliding counterpoise 6 by means of which the weight of the empty vessel V which will receive the substance to be weighed is counterbalanced. The counterpoise end of this lever also has a chain or the like 7, connected thereto, the other end of the chain being connected to a pulley 8, or the like, by turning which the amount of freely suspended chain can can be varied in order to give finer regulation as regards balancing the weight of the empty vessel.

The weigh beam 5 is also provided with a sliding counterpoise 9 and is provided with graduations (not shown) so that the counterpoise 9 can be adjusted to correspond with the predetermined load of substance. This beam is maintained against the action of the counterpoise in a position slightly inclined to the horizontal as indicated by a dot-and-dash line by means of an abutment 10 engaging the counterpoise end of the beam.

A vertical pointer member 11 is fixed to the weigh beam 5 at the fulcrum 12 and co-operates with a plus and minus scale 13 oppositely graduated to each side of a zero in known manner. Near its lower end the pointer has a lateral projection 14 on which is pivoted an obturating member 15 which extends beyond the top of the pointer and below the fulcrum. A counterweight 16 is provided at the lower end of said member and a further counterweight 17 is provided on an arm 18 projecting laterally from the obturating member at the same side, as, and beyond, the pointer, the effect of said lastmentioned counterweight being to urge the obturating member 15 into contact with a further lateral projection 19 on the pointer nearer the upper end thereof, the obturating member 15 thus being normally kept parallel with the pointer 11.

The upper end of the obturating member is adapted, when the pointer is at the zero position, as shown in Fig. 1, to engage flatly and close the open end of a vacuum tube 20 communicating with a source of vacuum. A branch pipe 21 leads from said tube to an enclosure 22, one wall of which is constituted by a flexible diaphragm 23 with concentric corrugations linked to a pivoted lever 24 having a projection or pawl 25 adapted to engage a ratchet-shaped notch 26 in a rotatable disc 27.

A supply-control valve 28 for the substance being weighed, for example, a gas, is provided in the supply pipe 29 leading to the vessel V on the scale pan 1. This valve is linked to the valve 30 in the flexible vacuum pipe 32 and also to said disc 27 by spring-urged link means 31 tending to move to the left in Fig. 1 as indicated by the arrow and thus to move the supply-control valve 28 and the vacuum valve 30 simultaneously to the closed positions.

The open ended tube 20 co-operating with the obturating member 15 is laterally adjustable by means of a rack 33 and pinion 34 in order to enable adjustment of the position of the weighing mechanism at which cut-off occurs. The tubes 21 and 32 are made flexible to permit of this adjustment. As shown in Fig. 1 cut off is occurring at the zero mark as indicated by the pointer 20a on the pipe 20.

In operation, the supply valve 28 is opened against the spring means, and as a consequence, the vacuum valve 30 is also opened, and the disc 27 is turned until the pawl 25 engages the notch 26 and retains the valves open. As the vessel V fills, the weigh beam 5 turns until the obturating member 15 engages the open ended tube 20 thus preventing further inflow of air to the source of vacuum and causing a vacuum to obtain in the diaphragm enclosure 22. The diaphragm 23 is pulled inwardly thus releasing the disc 27 and allowing the spring means to close the supply and vacuum valves 28 and 30. Thus, a predetermined quantity is measured into the weighing vessel V and due to the closure of the vacuum valve the obturating member 15 and pointer 11 can move freely away from the vacuum tube 20 for the next weighing operation.

The pivotal arrangement of the obturating member 15 on the pointer 11 prevents the apparatus being subjected to shock when the said member contacts with the tube 20 because the obturating member is capable of turning relative to the pointer 11 in the opposite direction to the forward turning or movement of the pointer. Thus even after the obturating member has contacted with the tube the pointer and associated weighing mechanism can move slightly further and so come to rest gradually.

Figs. 2 and 3 show a preferred form of obturating member. In this arrangement the pointer 11 has a lateral projection 35 on which is attached a flat spring obturating member 36 adapted to move longitudinally over a narrow aperture 37 in a front plate 38 movable on the dial 39, said aperture constituting an air inflow. The plate 38 is attached to a conduit 40 passing through a rear plate 42 and through an arcuate slot 43 in the dial 39. The plates and the conduit are kept in position with reference to the dial 39 by means of spring 44 which causes the plates 38 and 42 to clamp on to the dial 39. Adjustment of the plates and the aperture with reference to the dial 39 and therefore of the position at which cut-off takes place is effected by a screw 45 engaging a fixed support 46 and loosely connected to a lug 47 on the rear plate 42 so as to allow slight arcuate movement of said plate despite the straight line movement of the screw.

The conduit 40 passes through a substantially square guide block 50 which is attached to the plates 38, 42 and which slides in the slot 43 and serves to cause the aperture 37 to execute the proper arcuate movement.

In operation, when the resilient member 36 passes over the aperture 37 the end is drawn in to close the aperture which communicates with the flexible vacuum pipe 48 corresponding to pipe 20 in Fig. 1. Otherwise the apparatus and its operation is the same as in Fig. 1.

I claim:

1. In weighing apparatus adapted for measuring predetermined quantities of flowable substance, a source of subnormal fluid pressure, a conduit connected to said source having an end normally open to the atmosphere, substance supply control means adapted to be controlled from said fluid pressure, resilient means for urging the supply control means to a closed position, retaining means adapted to hold the supply control means in the closed position, said retaining means being controlled from said source of pressure, and an obturator on a moving part of the weighing mechanism adapted to close said end open to the atmosphere and thereby to cause the fluid pressure to effect closure of the supply control means when a predetermined weight has been reached, so that the supply of substance is cut off.

2. In weighing apparatus adapted for measuring predetermined quantities of flowable substance, a source of vacuum, a conduit connected to said source having an end normally open to the atmosphere, a substance supply control valve adapted to be controlled from said source, resilient means for urging the supply control valve to a closed position, retaining means adapted to hold said valve in the closed position, said retaining means being controlled from said source of vacuum, and an obturating member on a moving part of the weighing mechanism adapted to close said end open to the atmosphere and thereby to cause the action due to the vacuum to effect closure of the valve when a predetermined weight has been reached.

3. In weighing apparatus including a movable indicator and adapted for measuring predetermined quantities of flowable substance, vacuum means for cutting off the supply of substance being weighed when a predetermined load on the weighing apparatus is reached, an air inflow communicating with said vacuum means, an obturating member, movably mounted on said indicator and adapted to engage flatly with said inflow, which lies in a plane transverse to the indicator movement and means normally urging the obturating member to follow the indicator in contact therewith.

4. In weighing apparatus including a movable indicator pointer and adapted for measuring predetermined quantities of flowable substance, a source of vacuum, a substance supply control valve adapted to be controlled therefrom, an air inflow communicating with said source of vacuum, an obturating member pivotally mounted on the indicating pointer and adapted to engage flatly with said inflow, which lies in a plane transverse to the pointer movement, and counterweight means normally urging the obturating member to follow the pointer in contact therewith, the arrangement being such that closure of the supply control valve is effected under the vacuum action when a predetermined weight has been reached.

5. In weighing apparatus as claimed in claim 4, an air inflow which is displaceable in relation to the obturating member and adjustment means for displacing the inflow.

6. In weighing apparatus adapted for measuring predetermined quantities of flowable substance, a source of vacuum, a conduit connected to said source having an end normally open to the atmosphere, a substance supply control valve adapted to be controlled from said source, an obturating member on a moving part of the weighing mechanism adapted to close said end open to the atmosphere and thereby to cause the action due to the vacuum to effect closure of the valve when a predetermined weight has been reached, said obturating member being resilient and adapted to pass longitudinally over the open end and to be drawn in by the vacuum to close the open end and means for positionally adjusting the open end in relation to the obturating member.

ADRIANUS VAN DUYN.